US012772349B2

(12) United States Patent
Anton Falcon et al.

(10) Patent No.: US 12,772,349 B2
(45) Date of Patent: Oct. 20, 2026

(54) INDUCTION COOKING APPLIANCE

(71) Applicant: BSH Hausgeräte GmbH, Munich (DE)

(72) Inventors: Daniel Anton Falcon, Saragossa (ES); Alejandro del Cueto Belchi, Saragossa (ES); Jorge Felices Betran, Huesca (ES); Manuel Fernandez Martinez, Saragossa (ES); Jose Miguel Gil Narvion, Saragossa (ES); Pablo Jesus Hernandez Blasco, Saragossa (ES); Eduardo Imaz Martinez, Tudela (ES); Paul Muresan, La Cartuja (ES); Jose Manuel Palacios Gasos, Saragossa (ES); Alberto Perez Bosque, Saragossa (ES); Diego Puyal Puente, Saragossa (ES); Javier Serrano Trullen, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 960 days.

(21) Appl. No.: 18/010,475

(22) PCT Filed: Jun. 16, 2021

(86) PCT No.: PCT/EP2021/066196
§ 371 (c)(1),
(2) Date: Dec. 15, 2022

(87) PCT Pub. No.: WO2022/002587
PCT Pub. Date: Jan. 6, 2022

(65) Prior Publication Data

US 2023/0239974 A1 Jul. 27, 2023

(30) Foreign Application Priority Data

Jul. 1, 2020 (EP) .................................... 20382593

(51) Int. Cl.
*H05B 6/12* (2006.01)
*H05B 6/06* (2006.01)

(52) U.S. Cl.
CPC .................................. *H05B 6/1209* (2013.01)

(58) Field of Classification Search
CPC ......................... H05B 2213/05; H05B 6/1209; C12Q 1/6895; C12Q 2600/13; C12Q 2600/156; G16B 20/20
(Continued)

(56) References Cited

U.S. PATENT DOCUMENTS 10,271,386 B2 4/2019 Goetze
2010/0237064 A1* 9/2010 Liu ..................... H05B 6/1209 219/622
(Continued)

FOREIGN PATENT DOCUMENTS

DE 3711589 A1 10/1988
DE 102006043182 A1 4/2007
(Continued)

OTHER PUBLICATIONS

Translation of EP2312908, "Hotplate with sensors", Apr. 20, 2011, by WIPO (Year: 2011).*
(Continued)

*Primary Examiner* — Quang T Van
(74) *Attorney, Agent, or Firm* — Michael E. Tschupp; Andre Pallapies; Brandon G. Braun

(57) ABSTRACT

An induction cooktop apparatus includes an inductor, an insulating layer unit electrically insulating the inductor, and a detection coil for object recognition, the detection coil being connected to the insulating layer.

20 Claims, 6 Drawing Sheets

(58) Field of Classification Search
USPC ....... 219/624, 620, 622, 626, 634, 647, 660, 219/661, 671, 672
See application file for complete search history.

(56) References Cited

U.S. PATENT DOCUMENTS

| | | | |
|---|---|---|---|
| 2018/0213613 | A1 | 7/2018 | Matulla |
| 2019/0261467 | A1 | 8/2019 | Harald |

FOREIGN PATENT DOCUMENTS

| | | | | | |
|---|---|---|---|---|---|
| EP | 2312908 | A1 | | 4/2011 | |
| EP | 3139702 | A1 | * | 3/2017 | ........... H05B 6/1254 |
| EP | 3799527 | A1 | | 3/2021 | |
| LU | 81401 | A1 | * | 2/1981 | ........... H05B 6/1209 |

OTHER PUBLICATIONS

Translation of EP3139702, "Induction Coil Assembly for an Induction Cooking Hob", Mar. 8, 2017, by WIPO (Year: 2017).*
International Search Report PCT/EP2021/066196 dated Sep. 1, 2021.

* cited by examiner

INDUCTION COOKING APPLIANCE

CROSS-REFERENCES TO RELATED APPLICATIONS

This application is the U.S. National Stage of International Application No. PCT/EP2021/066196, filed Jun. 16, 2021, which designated the United States and has been published as International Publication No. WO 2022/002587 A1 and which claims the priority of European Patent Application, Serial No. 20382593.0, filed Jul. 1, 2020, pursuant to 35 U.S.C. 119(a)-(d).

The contents of International Application No. PCT/EP2021/066196 and European Patent Application, Serial No. 20382593.0 are incorporated herein by reference in their entireties as if fully set forth herein.

BACKGROUND OF THE INVENTION

The invention relates to an induction cooktop apparatus and a method for manufacturing an induction cooktop apparatus.

A plurality of induction cooktops which permit a detection of kitchenware elements are already known in the prior art. Often heating inductors which are built into induction cooktops are also used at the same time for detecting kitchenware elements. A drawback here is a high susceptibility to error. Additionally, a detection is only possible outside a heating operating state of the heating inductors. The arrangement of the heating inductors additionally results in a low spatial resolution and thus an inaccurate detection.

Other known solutions from the prior art, therefore, use coils as inductive sensors which are configured separately from heating inductors. For example, an induction cooktop with sensor coils which are arranged in each case between two adjacent heating inductors is disclosed in EP 3 316 663 A1. A spatial resolution is also limited in this case due to the arrangement of the sensor coils, and a thus detection of the kitchenware elements is relatively inaccurate. Thus an induction cooktop with separate sensors for detecting kitchenware elements is proposed in EP 2 312 908 A1, said sensors being applied to a separate plate which is arranged between the heating inductors and a cover plate. It is proposed in EP 3 079 443 A1 to incorporate separate sensors for detecting kitchenware elements in a flexible support layer which is arranged between the heating elements and a cover plate and which consists of textile material. A drawback in the solutions of EP 2 312 908 A1 and EP 3 079 443 A1 is a greater expenditure in terms of time and money during manufacture and during assembly due to the additional components for fastening the sensors.

BRIEF SUMMARY OF THE INVENTION

The object of the invention, in particular but not limited thereto, is to provide a generic apparatus with reduced effort in terms of manufacture and/or assembly.

The invention is based on an induction cooktop apparatus with at least one inductor and with at least one detection coil for object recognition, in particular of objects, for example items of cookware and/or cooking utensils, positioned and/or deposited on a positioning plate of the induction cooktop apparatus.

It is proposed that the induction cooktop apparatus has an insulating layer unit which is provided for electrically insulating the inductor and to which the detection coil is connected, in particular intrinsically.

The effort when manufacturing and/or assembling the induction cooktop apparatus can be advantageously reduced by means of such an embodiment, since no additional components are required as a support structure for the detection coil. It is also advantageously possible to achieve a cost saving thereby during the manufacture and/or assembly of the induction cooktop apparatus. In addition, advantageously a modular construction of the induction cooktop apparatus can also be made possible and a use in different types of induction cooktops can be made possible in a particularly simple manner. Moreover, a flexibility can be advantageously increased since a particularly flexible and simple adaptation of a geometry of the detection coil to a plurality of different types and/or geometries of inductors is possible when the detection coil is connected to the insulating layer unit. Moreover, relative to induction cooktops in which a heating inductor is used as a sensor at the same time, a susceptibility to error and an energy consumption during the detection can be advantageously reduced, and at the same time a particularly powerful and high-resolution object recognition can be made possible.

An “induction cooktop apparatus” is intended to be understood to mean at least a part, in particular a subassembly, of an induction cooktop, wherein in particular accessory units for the induction cooktop can be additionally encompassed thereby, such as for example a sensor unit for the external measurement of a temperature of an item of cookware and/or a food to be cooked. In particular, the induction cooktop apparatus can also comprise the entire induction cooktop. The induction cooktop apparatus has at least one inductor which in at least one operating state provides energy to at least one object, for example to an item of cookware. The inductor is provided in the operating state to provide energy in the form of an electromagnetic alternating field, advantageously for the purpose of an inductive energy transmission, to the object. The induction cooktop apparatus can have a plurality of further inductors, which in an assembled state can be arranged to be distributed, for example distributed in the manner of a matrix.

Preferably, the detection coil of the induction cooktop apparatus is provided for an inductive object recognition of metal objects, in particular of an item of cookware and/or further metal objects which can be configured differently from the item of cookware.

Preferably, the insulating layer unit is configured as a plate-shaped unit. The insulating layer unit has at least one material which is heat-resistant relative to temperatures of at least 250° C. and which is electrically insulating, for example mica and/or a plastics from the group of polyimides, and/or a different suitable heat-resistant and electronically insulating material. Preferably, the insulating layer unit is configured entirely from at least one heat-resistant and electrically insulating material. The detection coil could be selectively connected to the insulating layer unit. Preferably, the detection coil is connected intrinsically to the insulating layer unit, and namely such that at least a largest side surface of the detection coil is entirely covered by the insulating protective layer unit.

Preferably, the induction cooktop apparatus has a control unit which is provided to control the detection coil and to evaluate signals inductively detected by the detection coil for the object recognition. Preferably, in addition to controlling the detection coil, the control unit is also provided for controlling and supplying energy to the inductor and/or the further inductors of the induction cooktop apparatus. Preferably, for controlling and supplying energy to the inductor and/or the further inductors, the control unit has at least one inverter unit which can be configured, in particular, as a resonance inverter and/or as a dual half-bridge inverter. The inverter unit preferably comprises at least two switching elements which can be controlled individually by the control unit. A "switching element" is intended to be understood to mean an element which is provided between two points, in particular contacts of the switching element, to establish or disconnect an electrically conductive connection. Preferably, the switching element has at least one control contact via which it can be switched. Preferably, the switching element is configured as a semiconductor switching element, in particular as a transistor, for example as a metal oxide semiconductor field-effect transistor (MOSFET) or organic field-effect transistor (OFET), advantageously as a bipolar transistor, with a preferably insulated gate electrode (IGBT). Alternatively, it is conceivable that the switching element is configured as a mechanical and/or electromechanical switching element, in particular as a relay.

"Provided" is intended to be understood to mean specifically designed and/or equipped. An object being provided for a specific function is intended to be understood to mean that the object fulfills and/or performs this specific function in at least one use state and/or operating state.

It is also proposed that the detection coil is integrated in the insulating layer unit. An electrical insulation of the detection coil by means of the insulating layer unit can be advantageously achieved thereby. Preferably, the detection coil is integrated in the insulating layer unit such that at least a large part of a total surface area of the detection coil is covered by the insulating layer. The expression "covered at least to a large part" is intended to be understood to mean in this context that at least 55%, advantageously at least 65%, particularly advantageously at least 75%, preferably at least 85% and particularly preferably at least 95% of a total surface area of an object is covered by at least one further object.

It is also proposed that the insulating layer unit has a first insulating layer element and a second insulating layer element, the detection coil being arranged therebetween. An assembly can be advantageously further simplified by means of such an embodiment. In particular, the detection coil can be advantageously integrated in the insulating layer unit by simple technical means. Preferably, the first insulating layer element is connected by a material connection, for example by means of an adhesively bonded connection, to the second insulating layer element.

It is also proposed that the detection coil is printed on the first insulating layer element. A flexibility in the manufacture can be advantageously increased by means of such an embodiment. In particular, the geometry of the induction coil can be advantageously adapted in a particularly simple and flexible manner to different types and/or geometries of inductors. Preferably, the detection coil is printed on the first insulating layer element by means of a printing method which is known by the English technical term "functional printing" and which is used, in particular, when populating printed circuit boards. Preferably, all of the materials of which the printed detection coil consists, are heat-resistant relative to temperatures of at least 250° C.

It is also proposed that the detection coil is adhesively bonded between the first insulating layer element and the second insulating layer element. As a result, a manufacture and/or assembly can be advantageously simplified. Additionally, a particularly cost-effective induction cooktop apparatus can be advantageously provided when the detection coil is adhesively bonded between the first insulating layer element and the second insulating layer element. Preferably, the detection coil is adhesively bonded between the first insulating layer element and the second insulating layer element by means of an adhesive, for example silicone or the like, which is resistant to temperatures of at least 250° C.

The first insulating layer element and the second insulating layer element could have at least substantially identical surface extensions. In an advantageous embodiment, however, it is proposed that the first insulating layer element and the second insulating layer element have substantially different surface extensions. It is advantageously possible to save material by means of such an embodiment. Preferably, the second insulating layer element has a smaller surface extension compared to the first insulating protective element. In particular, the surface extension of the second insulating layer element is at least 10%, advantageously at least 15%, particularly advantageously at least 20%, preferably at least 25% and particularly preferably at least 30% smaller than the surface extension of the first insulating layer element. As a result, a cost saving can be advantageously achieved during the manufacture of the insulating layer unit. A "surface extension" of an object is intended to be understood to mean in this case a longest extension of a largest side surface of the object.

The second insulating layer element could have a substantially larger surface extension relative to the detection coil. In an advantageous embodiment, however, it is proposed that the second insulating layer element is adapted to the detection coil relative to its surface extension. A material saving and thus a cost saving can be advantageously achieved by means of such an embodiment.

It is also proposed that the induction cooktop apparatus has a further detection coil which is connected, in particular intrinsically, to the insulating layer unit. An accuracy in the object recognition can be advantageously further improved by means of such an embodiment. In particular, an object recognition of objects having different sizes of diameters and/or a simultaneous object recognition of a plurality of objects can be advantageously made possible. The detection coil and the further detection coil can be arranged so as to be spaced apart from one another. The detection coil and the further detection coil can have at least substantially identical surface extensions. Alternatively, it is conceivable that the detection coil and the further detection coil have different surface extensions. The detection coil could be arranged, for example, in a central region of the insulating layer unit, in particular around a central point of the insulating layer unit, and the further detection coil could be arranged in an edge region of the insulating layer unit, in particular concentrically around the detection coil. Many different arrangements between the detection coil and the further detection coil, which appear expedient to the person skilled in the art, are conceivable.

It is also proposed that the further detection coil is integrated in the insulating layer unit. As a result, an assembly can be advantageously simplified. Additionally, an electrical insulation of the further detection coil can be advantageously achieved by simple technical means. Preferably, the further detection coil is integrated in the insulating layer unit such that at least a large part of a total surface area of the further detection coil is covered by the insulating layer.

It is also proposed that the induction cooktop apparatus has a connecting element, the detection coil and the further detection coil being able to be connected thereby to a control unit. The induction cooktop apparatus could have a plurality of connecting elements to form a connection of the detection coil and the further detection coil to the control unit. Preferably, the induction cooktop apparatus has exactly one connecting element, the detection coil and the further detection coil being able to be jointly connected thereby to the control unit. Preferably, the connecting element is provided for a bi-directional transmission of electrical signals between the detection coil and/or the further detection coil and the control unit. As a result, a material saving and thus a cost saving can be advantageously achieved. Additionally, an assembly can be advantageously further simplified.

It is also proposed that the induction cooktop apparatus has an inductor matrix, in particular an inductor vector, the inductor forming part thereof. A high degree of flexibility can be advantageously made possible by means of such an embodiment. An "inductor matrix" is intended to be understood to mean a two-dimensional arrangement of a plurality of at least two inductors relative to a main extension plane of the inductor. The inductor matrix is configured by at least one inductor vector. An "inductor vector" is intended to be understood to mean a two-dimensional arrangement of the inductor from at least one further inductor of the induction cooktop apparatus relative to the main extension plane of the inductor, wherein an imaginary straight line in the main extension plane runs through a central point of the surface of the inductor and a central point of the surface of the further inductor. The inductor vector can have a plurality of further inductors. Preferably, the inductor matrix is configured from at least one first inductor vector and at least one second inductor vector which is oriented within the main extension plane at right-angles to the first inductor vector, wherein the inductor and/or the further inductor can be part of the first inductor vector and the second inductor vector at the same time. A "main extension plane" of a structural unit is intended to be understood to mean a plane which is parallel to a largest side surface of a smallest imaginary cuboid which only just completely encloses the structural unit and, in particular, runs through the central point of the cuboid.

The invention further relates to an induction cooktop with an induction cooktop apparatus as claimed in one of the above-described embodiments. Such an induction cooktop is characterized, in particular, by the aforementioned advantageous properties of the induction cooktop apparatus.

The invention is also based on a method for manufacturing an induction cooktop apparatus, with at least one inductor and at least one detection coil for object recognition, in particular of objects, for example items of cookware and/or cooking utensils, positioned and/or deposited on a hotplate of the induction cooktop apparatus.

It is proposed that the detection coil is connected, in particular intrinsically, to an insulating layer unit which is provided for electrically insulating the inductor. The manufacture of the induction cooktop apparatus can be advantageously improved by means of such a method. A use of further additional components as a support structure for the detection coil can be advantageously dispensed with by the detection coil being connected to the insulating layer unit, whereby a particularly simple and or rapid and/or cost-effective manufacture of the induction cooktop apparatus is advantageously made possible. Additionally, a particularly flexible method for manufacturing the induction cooktop apparatus can be advantageously provided when the detection coil is integrated in the insulating layer unit since a geometry of the detection coil can be particularly easily adapted to a geometry of the inductor.

In this case, the induction cooktop apparatus is not intended to be limited to the above-described use and embodiment. In particular, for fulfilling a mode of operation described herein the induction cooktop apparatus can have a number of individual elements, components and units which differs from a number mentioned herein.

Further advantages emerge from the following description of the drawings. Exemplary embodiments of the invention are shown in the drawing. The drawing, the description and the claims contain numerous features in combination. The person skilled in the art will also expediently consider the features individually and combine them to form further meaningful combinations.

DETAILED DESCRIPTION OF EXEMPLARY EMBODIMENTS OF THE PRESENT INVENTION

Figure 1:
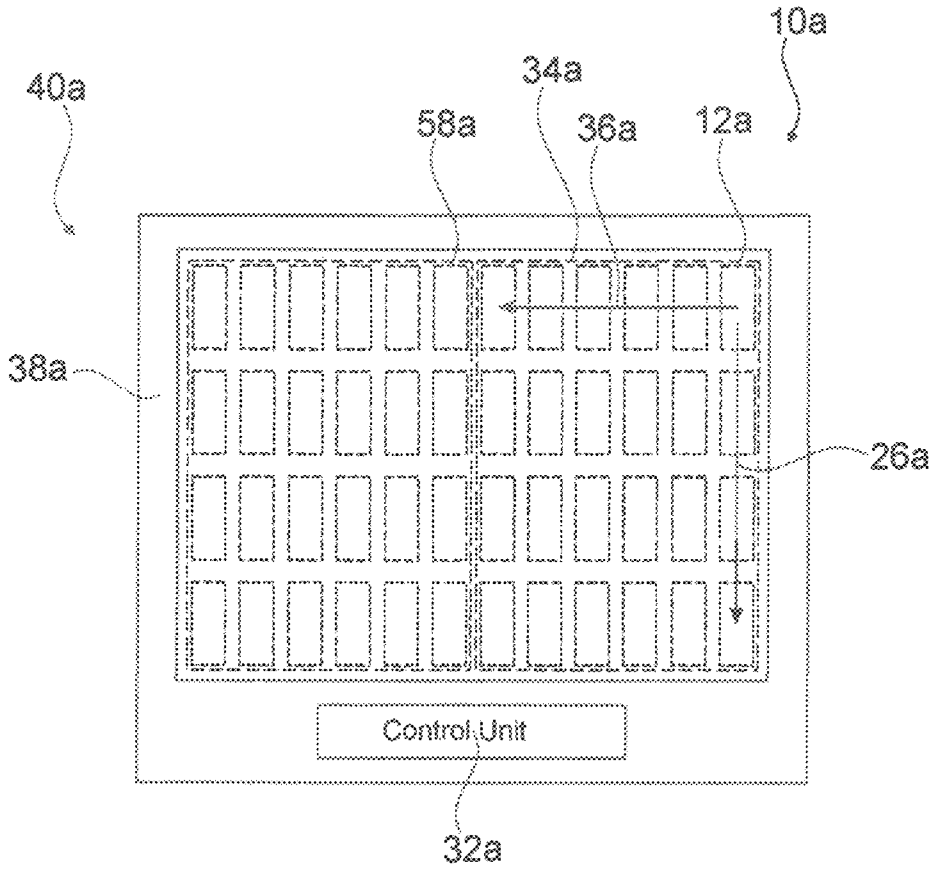
FIG. 1 shows an induction cooktop with an induction cooktop apparatus.

FIG. 1 shows an induction cooktop 40*a*. The induction cooktop 40*a* is configured as a matrix induction cooktop. The induction cooktop 40*a* has an induction cooktop apparatus 10*a*. The induction cooktop apparatus 10*a* comprises at least one inductor 12*a* which in FIG. 1 is shown simplified as a rectangular box. The inductor 12*a* is provided for heating items of cookware (not shown) which can be placed on a positioning plate 38*a* of the induction cooktop 40*a*.

The induction cooktop 40*a* has a plurality of further inductors 58*a*. The induction cooktop 40*a* has a control unit 32*a*. The control unit 32*a* is provided for controlling and supplying energy to the inductor 12*a* and the further inductors 58*a*.

The induction cooktop apparatus 10*a* has an inductor matrix 34*a*. In the present case, the inductor matrix 34*a* is configured by a first inductor vector 26*a* and a second inductor vector 36*a*. The inductor 12*a* of the induction cooktop apparatus 10*a* is part of the inductor matrix 34*a*.

In the figures, in each case only one object of the objects repeatedly present is provided with a reference character.

Figure 2:
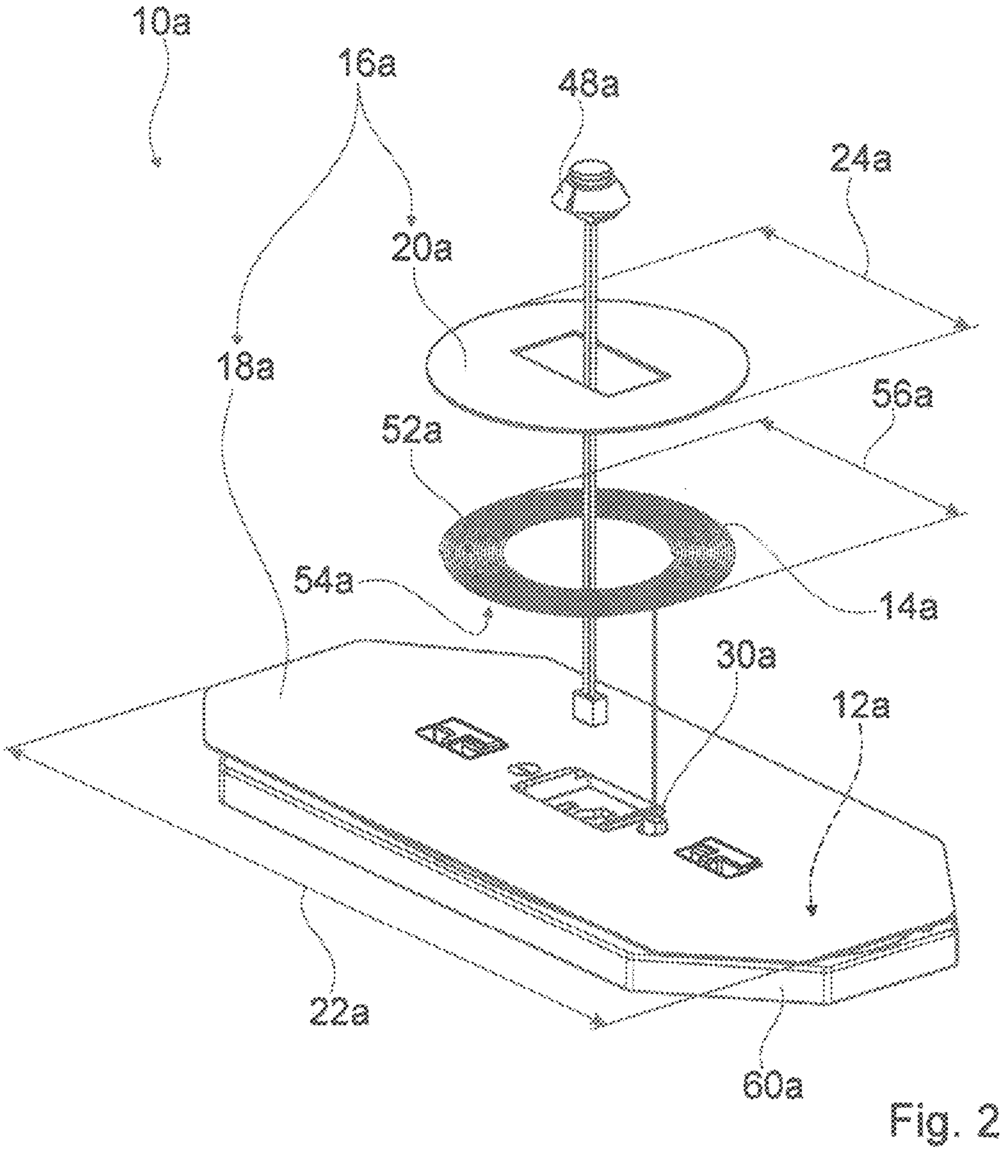
FIG. 2 shows the induction cooktop apparatus comprising an inductor, a detection coil and an insulating layer unit in a schematic exploded view.

FIG. 2 shows an induction cooktop apparatus 10*a* in a schematic exploded view. The induction cooktop apparatus 10*a* comprises the detection coil 14*a*. The detection coil 14*a* is provided for object recognition. The detection coil 14*a* is provided, for example, for detecting an item of cookware (not shown) positioned on the positioning plate 38*a* of the induction cooktop 40*a* (see FIG. 1) or incorrectly positioned metal objects (not shown).

The induction cooktop apparatus 10*a* has an insulating layer unit 16*a*. The insulating layer unit 16*a* is provided for electrically insulating the inductor 12*a*. The detection coil 14*a* is connected to the insulating layer unit 16*a*. In the present exemplary embodiment, the detection coil 14*a* is integrated in the insulating layer unit 16*a*. The detection coil 14*a* is integrated in the insulating layer 16*a* such that an upper largest side surface 52*a* and a lower largest side surface 54*a* of the detection coil 14*a* in each case are entirely covered by the insulating layer unit 16*a*.

The insulating layer unit 16*a* has a first insulating layer element 18*a*. In an assembled state of the induction cooktop apparatus 10*a* the first insulating layer element 18*a* is arranged above the inductor 12*a* and is provided for electrically insulating the inductor 12*a*. The insulating layer unit 16*a* has a second insulating layer element 20*a*. In the assembled state, the detection coil 14*a* is arranged between the first insulating layer element 18*a* and the second insulating layer element 20*a*. In the present exemplary embodiment, the detection coil 14*a* is adhesively bonded between the first insulating layer element 18*a* and the second insulating layer element 20*a*. The second insulating layer element 20*a* is provided for electrically insulating the detection coil 14*a*. The first insulating layer element 18*a* and the second insulating layer element 20*a* of the insulating layer unit 16*a* are configured in each case from a heat-resistant and electrically insulating material. In the present case, the first insulating layer element 18*a* and the second insulating layer element 20*a* are manufactured in each case from mica and are heat-resistant relative to temperatures of at least 250° C.

The first insulating layer element 18*a* and the second insulating layer element 20*a* have substantially different surface extensions 22*a*, 24*a*. The first insulating layer element 18*a* has a first surface extension 22*a*. The second insulating layer element 20*a* has a second surface extension 24*a*. The first surface extension 22*a* of the first insulating layer element 18*a* is substantially larger than the second surface extension 24*a* of the second insulating layer element 20*a*. The second insulating layer element 20*a* is adapted in terms of its surface extension 24*a* to the detection coil 14*a*. The surface extension 24*a* of the second insulating layer element 20*a* is fractionally larger than the main extension 56*a* of the detection coil 14*a*.

The induction cooktop apparatus 10*a* has a coil support 60*a*. The inductor 12*a* is arranged in the coil support 60*a* and is covered by the first insulating layer element 18*a*. The induction cooktop apparatus 10*a* has a connecting element 48*a*. The connecting element 48*a* is provided for fastening the inductor 12*a* to the coil support 60*a*. The inductor 12*a* can be connected in an electrically conductive manner to the control unit 32*a* of the induction cooktop 40*a* by means of the connecting element 48*a* (see FIG. 1).

The induction cooktop apparatus 10*a* has a connecting element 30*a*. The connecting element 30*a* is connected to the detection coil 14*a*. The detection coil 14*a* can be connected to the control unit 32*a* of the induction cooktop 40*a* by means of the connecting element 30*a*.

Figure 3:
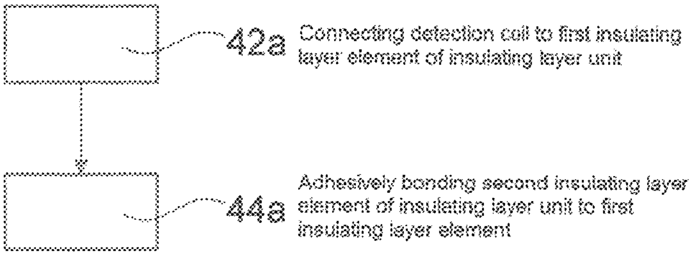
FIG. 3 shows a schematic diagram to illustrate a method for manufacturing the induction cooktop apparatus.

FIG. 3 shows a schematic diagram to illustrate a method for manufacturing the induction cooktop apparatus 10*a*. In the method, the detection coil is connected to an insulating layer unit which is provided for electrically insulating the inductor. In a method step 42*a* of the method, the detection coil 14*a* is connected to the first insulating layer element 18*a* of the insulating layer unit 16*a*, for example adhesively bonded or printed thereon. In a further method step 44*a*, the second insulating layer element 20*a* of the insulating layer unit 16*a* is adhesively bonded to the first insulating layer element 18*a* so that the detection coil 14*a* is arranged between the first insulating layer element 18*a* and the second insulating layer element 20*a* and is integrated in the insulating layer unit 16*a*.

Four further exemplary embodiments of the invention are shown in FIGS. 4 to 7. The following descriptions are substantially limited to the differences between the exemplary embodiments, wherein relative to components, features and functions remaining the same, reference can be made to the description of the exemplary embodiment of FIGS. 1 to 3. In order to differentiate between the exemplary embodiments, the letter a in the reference characters of the exemplary embodiment in FIGS. 1 to 3 is replaced by the letters b to e in the reference characters of the exemplary embodiments in FIGS. 4 to 7. Relative to components which are denoted the same, in particular with reference to components having the same reference characters, in principle reference can be made to the drawings and/or the description of the exemplary embodiment in FIGS. 1 to 3.

Figure 4:
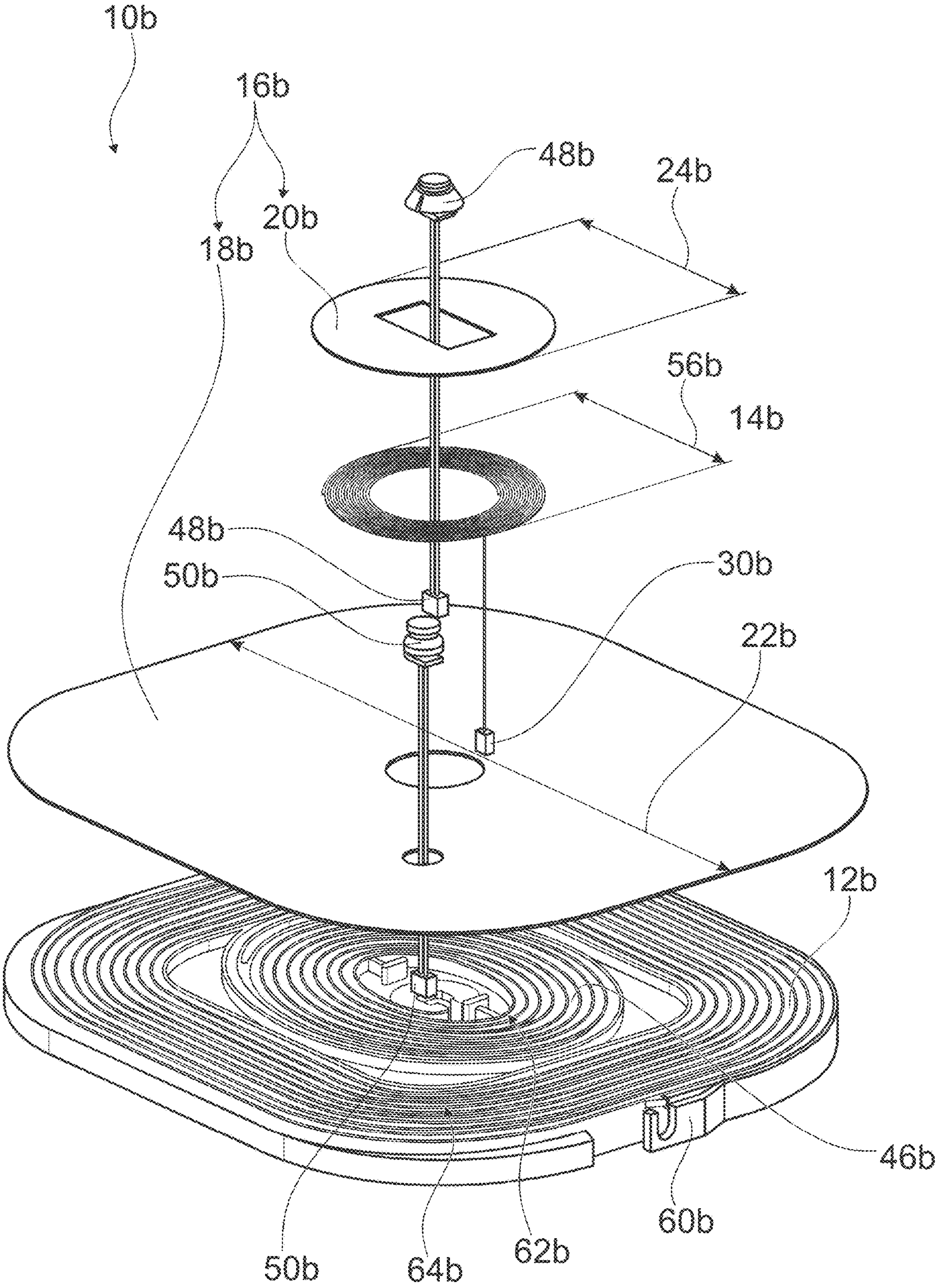
FIG. 4 shows a further exemplary embodiment of an induction cooktop apparatus in a schematic exploded view.

FIG. 4 shows a further exemplary embodiment of an induction cooktop apparatus 10*b* in a schematic exploded view. The induction cooktop apparatus 10*b* has an inductor 12*b* and a further inductor 46*b*. The inductor 12*b* and the further inductor 46*b* are arranged jointly in a coil support 60*b* of the induction cooktop apparatus 10*b*. The inductor 12*b* is arranged in a central region 62*b* of the coil support 60*b*. The further inductor 46*b* is arranged in an edge region 64*b* of the coil support 60*b* concentrically around the inductor 12*b*. The inductor 12*b* is fastened by means of a connecting element 48*b* to the coil support 60*b* and can be connected in an electrically conductive manner to a control unit (not shown). The further inductor 46*b* is connected by means of a further connecting element 50*b* to the coil support 60*b* and can be connected in an electrically conductive manner to the control unit. The inductor 12*b* can be operated independently of the further inductor 46*b*. The further inductor 46*b* can be switched to the inductor 12*b* in order to heat an item of cookware (not shown) having a larger diameter.

The induction cooktop apparatus 10*b* comprises a detection coil 14*b*. The detection coil 14*b* is provided for object recognition and is configured substantially identically to the detection coil 14*a* of the induction cooktop apparatus 10*a* of the above exemplary embodiment. The induction cooktop apparatus 10*b* has an insulating layer unit 16*b* to which the detection coil 14*b* is connected. The insulating layer unit 16*b* has a first insulating layer element 18*b* and a second insulating layer element 20*b*, the detection coil 14*b* being adhesively bonded therebetween. The first insulating layer element 18*b* is provided for electrically insulating the inductor 12*b* and the further inductor 46*b*, and is adapted to a geometry of the coil support 60*b*. The second insulating layer element 20*b* of the insulating layer unit 16*b* is configured substantially identically to the second insulating layer element 20*a* of the induction cooktop apparatus 10*a* of the previous exemplary embodiment.

A method for manufacturing the induction cooktop apparatus 10*b* takes place in a substantially similar manner to the above-described method for manufacturing the induction cooktop apparatus 10*a*, which is why at this point reference might be made to the description of FIG. 3 in this regard.

Figure 5:
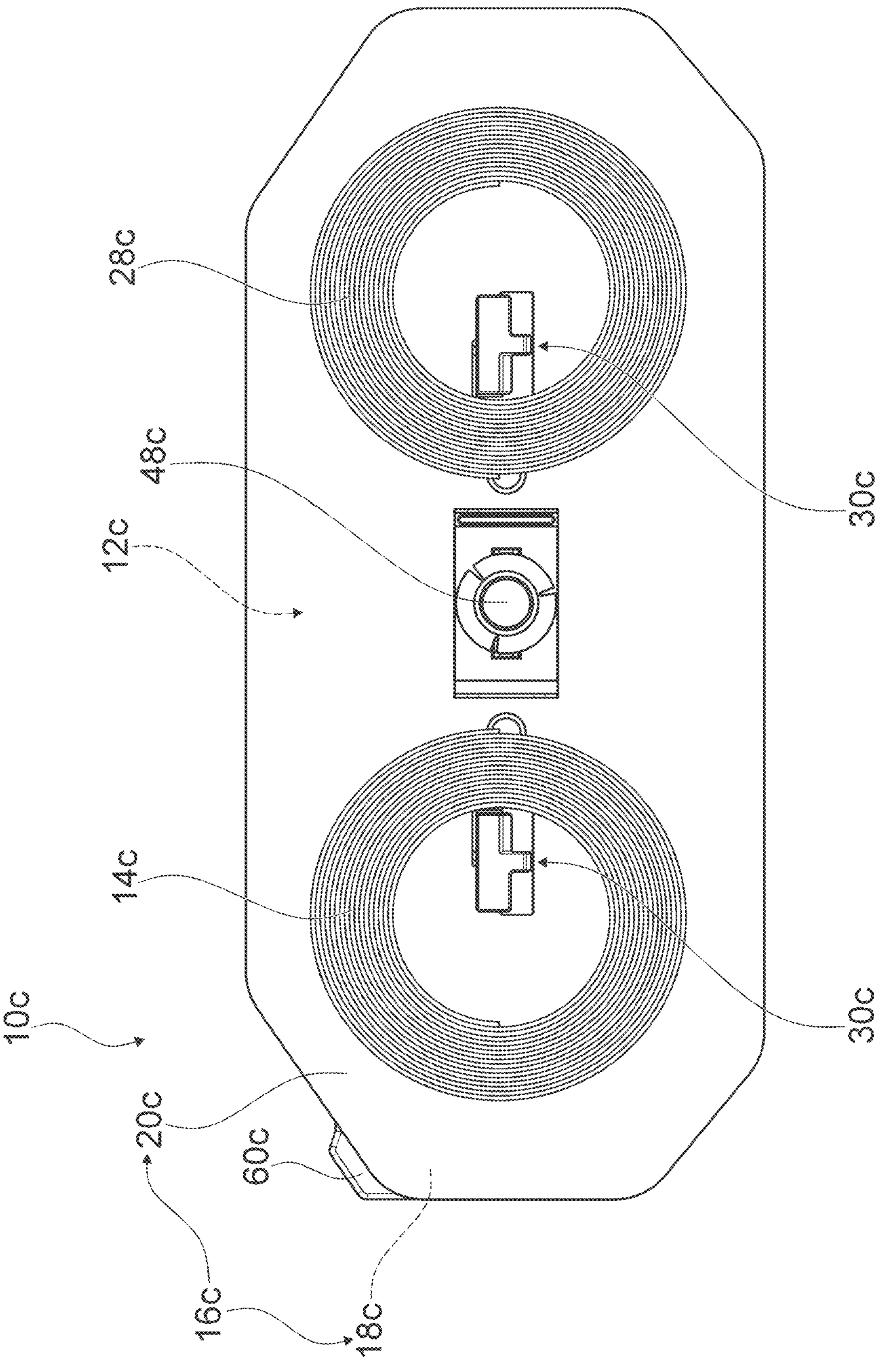
FIG. 5 shows a further exemplary embodiment of an induction cooktop apparatus in a schematic plan view.

FIG. 5 shows a further exemplary embodiment of an induction cooktop apparatus 10*c* in a schematic plan view. The induction cooktop apparatus 10*c* has an inductor 12*c*. The induction cooktop apparatus 10*c* comprises a detection coil 14*c*. The detection coil 14*c* is provided for object recognition. The induction cooktop apparatus 10*c* has an insulating layer unit 16*c*. The insulating layer unit 16*c* is provided for electrically insulating the inductor 12_c_. The detection coil 14_c_ is connected to the insulating layer unit 16_c_. In the present exemplary embodiment, the detection coil 14_c_ is integrated in the insulating layer unit 16_c_.

The induction cooktop apparatus 10_c_ has a further detection coil 28_c_ which is provided for object recognition. The further detection coil 28_c_ is connected to the insulating layer unit 16_c_. In the present case, the further detection coil 28_c_ is integrated in the insulating layer unit 28_c_.

The induction layer unit 16_c_ has a first insulating layer element 18_c_ and a second insulating layer element 20_c_, the detection coil 14_c_ and the further detection coil 28_c_ being adhesively bonded therebetween.

The induction cooktop apparatus 10_c_ has a connecting element 30_c_. The detection coil 14_c_ and the further detection coil 28_c_ can be connected by means of the connecting element to a control unit (not shown).

A method for manufacturing the induction cooktop apparatus 10_c_ takes place in a substantially similar manner to the above-described method for manufacturing the induction cooktop apparatus 10_a_, wherein in the method additionally the further detection coil 28_c_ is connected to the insulating layer unit 16_c_. The connection of the further detection coil 28_c_ in the insulating layer unit 16_c_ takes place in a similar manner to the above-described connection of the detection coil 14_a_ in the exemplary embodiment shown in FIG. 3.

Figure 6:
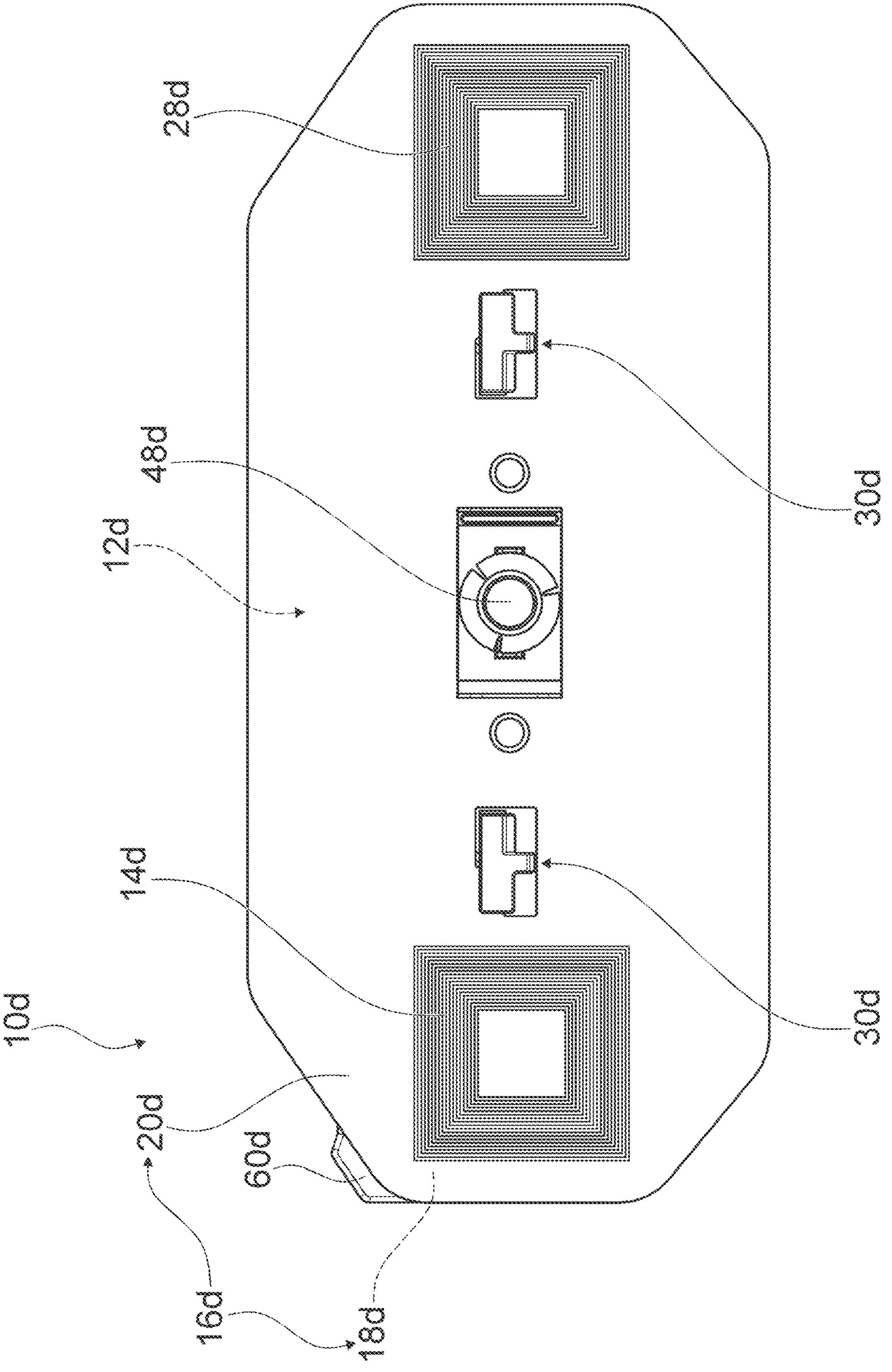
FIG. 6 shows a further exemplary embodiment of an induction cooktop apparatus in a schematic plan view and FIG. 7 shows a further exemplary embodiment of an induction cooktop apparatus in a schematic plan view.

FIG. 6 shows a further exemplary embodiment of an induction cooktop apparatus 10_d_ in a schematic plan view. The induction cooktop apparatus 10_d_ substantially differs from the induction cooktop apparatus 10_c_ of the above exemplary embodiment regarding a design of a detection coil 14_d_ and a further detection coil 28_d_. The induction cooktop apparatus 10_d_ has an insulating layer unit 16_d_. The insulating layer unit 16_d_ has a first insulating layer element 18_d_ and a second insulating layer element 20_d_, the detection coil 14_d_ and the further detection coil 28_d_ being arranged therebetween. The detection coil 14_d_ is printed on the first insulating layer element 18_d_. The further detection coil 28_d_ is printed on the first insulating layer element 18_d_. The induction cooktop apparatus 10_d_ has a connecting element 30_d_. The detection coil 14_d_ and the further detection coil 28_d_ can be connected by means of the connecting element 30_d_ to a control unit (not shown).

A method for manufacturing the induction cooktop apparatus 10_d_ takes place in a substantially similar manner to the above-described method for manufacturing the induction cooktop apparatus 10_a_, wherein in the method additionally the detection coil 14_d_ and the further detection coil 28_d_ are printed on the first insulating layer element 18_d_ of the insulating layer unit 16_d_ and the second insulating layer element 20_d_ is adhesively bonded to the first insulating layer element 18_d_.

Figure 7:
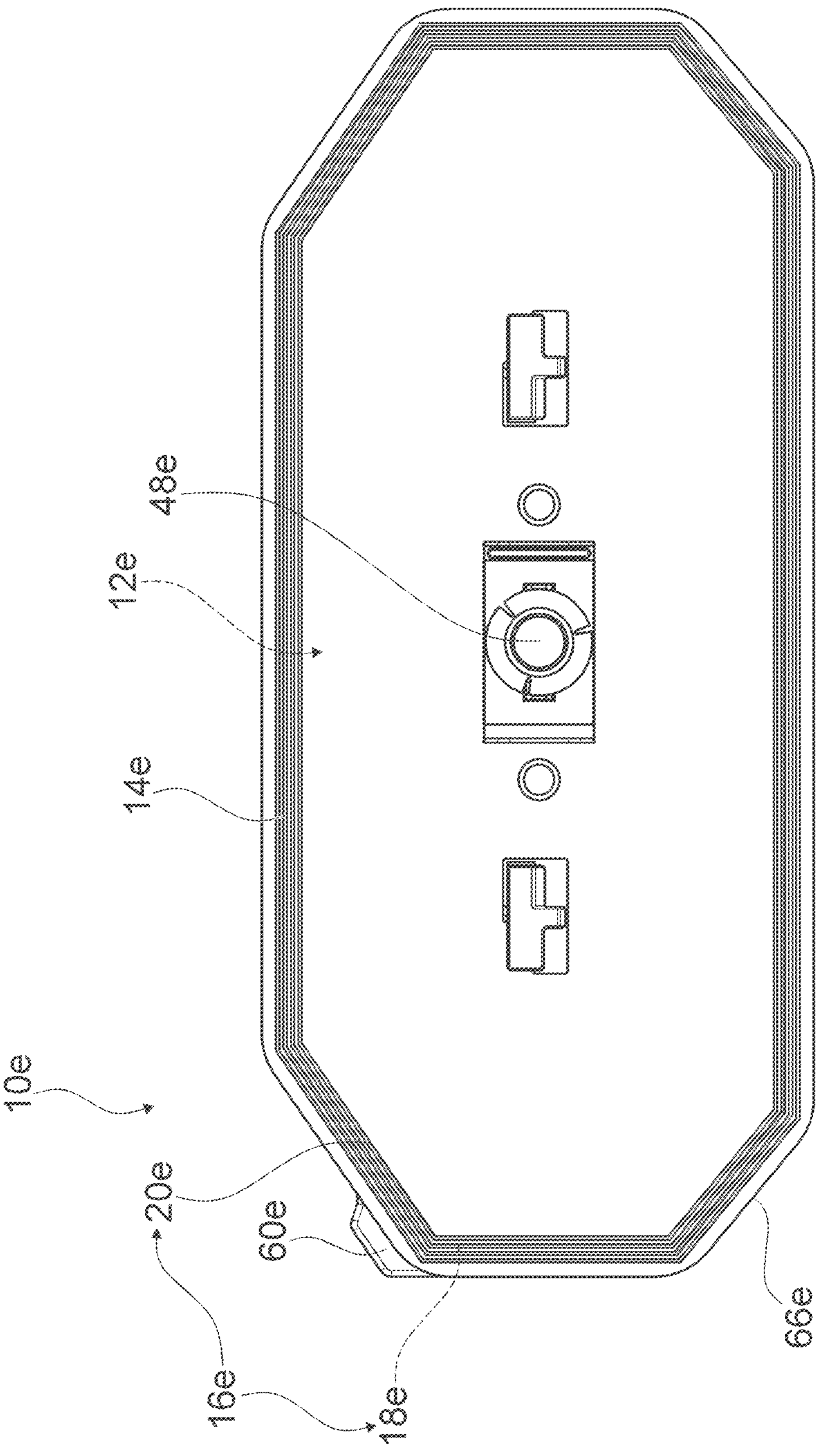

FIG. 7 shows a further exemplary embodiment of an induction cooktop apparatus 10_e_ in a schematic plan view. The induction cooktop apparatus 10_e_ has an inductor 12_e_, a detection coil 14_e_ and an insulating layer unit 16_e_. The detection coil 14_e_ is connected to the insulating layer unit 16_e_. The insulating layer unit 16_e_ has a first insulating layer element 18_e_ and a second insulating layer element 20_e_, the detection coil 14_e_ being arranged therebetween. The detection coil 14_e_ is printed on the first insulating layer element 18_e_ of the insulating layer unit 16_e_. The detection coil 14_e_ is printed around the periphery of the first insulating layer element 18_e_. In an assembled state, the detection coil 14_e_ has a uniform spacing from an outer edge 66_e_ of a coil support 60_e_ in which the inductor 12_e_ is arranged.

A method for manufacturing the induction cooktop apparatus 10_e_ takes place in a substantially similar manner to the above-described method for manufacturing the induction cooktop apparatus 10_a_ which is why at this point reference might be made to the description of FIG. 3 in this regard.

The invention claimed is:

1. An induction cooktop apparatus, comprising:

an inductor;

an insulating layer unit electrically insulating the inductor; and a detection coil for object recognition, said detection coil connected to the insulating layer, wherein the insulating layer unit includes a first insulating layer element and a second insulating layer element, said detection coil being arranged between the first insulating layer element and the second insulating layer element, and the inductor is located outside of the insulating layer unit.

2. The induction cooktop apparatus of claim 1, wherein the detection coil is integrated in the insulating layer unit.

3. The induction cooktop apparatus of claim 1, wherein the detection coil is printed on the first insulating layer element.

4. The induction cooktop apparatus of claim 1, wherein the detection coil is adhesively bonded between the first insulating layer element and the second insulating layer element.

5. The induction cooktop apparatus of claim 1, wherein the first insulating layer element and the second insulating layer element have substantially different surface extensions.

6. The induction cooktop apparatus of claim 1, wherein the second insulating layer element has a surface extension, and the surface extension and the detection coil have a same shape.

7. The induction cooktop apparatus of claim 1, further comprising a further detection coil connected to the insulating layer unit.

8. The induction cooktop apparatus of claim 7, wherein the further detection coil is integrated in the insulating layer unit.

9. The induction cooktop apparatus of claim 7, further comprising a connecting element configured to connect the detection coil and the further detection coil to a control unit.

10. The induction cooktop apparatus of claim 1, further comprising an inductor matrix, said inductor forming part of the inductor matrix.

11. The induction cooktop apparatus of claim 10, wherein the inductor matrix is an inductor vector.

12. The induction cooktop apparatus of claim 1, wherein the first insulating layer element directly contacts the detection coil, and the second insulating layer element directly contacts the detection coil.

13. An induction cooktop, comprising an induction cooktop apparatus, said induction cooktop apparatus comprising an inductor, an insulating layer unit electrically insulating the inductor, and a detection coil for object recognition, said detection coil connected to the insulating layer, wherein the insulating layer unit includes a first insulating layer element and a second insulating layer element, said detection coil being arranged between the first insulating layer element and the second insulating layer element, and the inductor is located outside of the insulating layer unit.

14. The induction cooktop of claim 13, wherein the first insulating layer element and the second insulating layer element have substantially different surface extensions.

15. A method for manufacturing an induction cooktop apparatus, said method comprising:

electrically insulating an inductor by an insulating layer unit;

connecting a detection coil for object recognition to the insulating layer unit;

arranging the detection coil between a first insulating layer element and a second insulating layer element of the insulating layer unit; and arranging the inductor outside of the insulating layer unit.

16. The method of claim 15, wherein the detection coil is integrated in the insulating layer unit.

17. The method of claim 15, further comprising printing the detection coil on the first insulating layer element.

18. The method of claim 15, further comprising adhesively bonding the detection coil between the first insulating layer element and the second insulating layer element.

19. The method of claim 15, further comprising matching a surface extension of the second insulating layer element to a shape of the detection coil.

20. The method of claim 15, further comprising:

integrating a further detection coil in the insulating layer unit; and connecting the detection coil and the further detection coil to a control unit.

* * * * *